US012573678B2

(12) United States Patent
Chen et al.

(10) Patent No.: US 12,573,678 B2
(45) Date of Patent: Mar. 10, 2026

(54) RECYCLING ALL SOLID STATE BATTERY TECHNOLOGY

(71) Applicant: THE REGENTS OF THE UNIVERSITY OF CALIFORNIA, Oakland, CA (US)

(72) Inventors: Zheng Chen, San Diego, CA (US); Darren Huan Shen Tan, La Jolla, CA (US); Abhik Banerjee, La Jolla, CA (US); Ying Shirley Meng, La Jolla, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 856 days.

(21) Appl. No.: 17/782,977

(22) PCT Filed: Dec. 10, 2020

(86) PCT No.: PCT/US2020/064288
§ 371 (c)(1),
(2) Date: Jun. 6, 2022

(87) PCT Pub. No.: WO2021/119295
PCT Pub. Date: Jun. 17, 2021

(65) Prior Publication Data
US 2023/0014961 A1 Jan. 19, 2023

Related U.S. Application Data

(60) Provisional application No. 62/946,343, filed on Dec. 10, 2019.

(51) Int. Cl.
*H01M 10/54* (2006.01)
*B09B 3/40* (2022.01)
(Continued)

(52) U.S. Cl.
CPC ............... *H01M 10/54* (2013.01); *B09B 3/40* (2022.01); *B09B 3/70* (2022.01); *B09B 3/80* (2022.01);
(Continued)

(58) Field of Classification Search
USPC ........................................................ 423/140
See application file for complete search history.

(56) References Cited

U.S. PATENT DOCUMENTS 9,484,606 B1 * 11/2016 Sloop .................... H01M 10/54
2013/0302226 A1 11/2013 Wang et al.
(Continued)

FOREIGN PATENT DOCUMENTS

| CN | 104852102 A | 8/2015 |
| CN | 106684487 A | 5/2017 |

(Continued)

OTHER PUBLICATIONS

Arnold ("Electrochemical and morphological properties of chloride-doped lithium argyrodite solid electrolytes", M.S. thesis, 2018) (Year: 2018).*
(Continued)

*Primary Examiner* — Christina A Johnson
(74) *Attorney, Agent, or Firm* — Eleanor Musick; Torrey Pines Law Group PC

(57) ABSTRACT

In a method for recycling all solid-state batteries, spent battery cells are dissolved in anhydrous ethanol. The resulting solution is separated into solids and supernatants which are separately processed to regenerate the solid electrolyte and the solid electrode materials. The supernatant is subjected to vacuum evaporation to precipitate an electrolyte powder, which is then annealed under flowing oxygen. The solid electrode material is regenerated by washing the solids with water, drying the washed solids, relithiating the washed
(Continued)

solids, and annealing the relithiated solids. The resulting materials are suitable for use in fabrication of new all-solid state batteries.

20 Claims, 8 Drawing Sheets

(51) Int. Cl.

| | |
|---|---|
| *B09B 3/70* | (2022.01) |
| *B09B 3/80* | (2022.01) |
| *B09B 101/16* | (2022.01) |
| *C01B 25/14* | (2006.01) |
| *C01G 51/42* | (2025.01) |
| *H01M 4/38* | (2006.01) |
| *H01M 4/525* | (2010.01) |
| *H01M 10/0562* | (2010.01) |
| *H01M 10/0585* | (2010.01) |

(52) U.S. Cl.

CPC .............. *C01B 25/14* (2013.01); *C01G 51/42* (2013.01); *H01M 10/0585* (2013.01); *B09B 2101/16* (2022.01); *C01P 2002/72* (2013.01); *C01P 2002/82* (2013.01); *C01P 2006/40* (2013.01); *H01M 4/382* (2013.01); *H01M 4/525* (2013.01); *H01M 10/0562* (2013.01); *H01M 2300/008* (2013.01)

(56) References Cited

U.S. PATENT DOCUMENTS

2018/0013181 A1* 1/2018 Ho .......................... H01M 6/52
2019/0198870 A1* 6/2019 Watano ................. H01M 4/587

FOREIGN PATENT DOCUMENTS

JP      2004292699 A    10/2004
WO      2018187731 A1    10/2018

OTHER PUBLICATIONS

Univ of Washington (archived webpage, dated Jul. 15, 2019; (Year: 2019).*
Shi et.al. ("Effective regeneration of LiCoO2 from spent lithium-ion batteries: a direct approach towards high-performance active particles", Green Chem., 2018, 20, 851-862) (Year: 2018).*
International Search Report, PCT/US2020/064288, Mar. 11, 2021.
Li, Jainlin, et al., Water-Based Electrode Manufacturing and Direct Recycling of Lithium-Ion Battery Electrodes—A Green and Sustainable Manufacturing System, iScience 23, 101081, May 22, 2020.
Tan, D., et al., Sustainable design of fully recyclable all solid-state batteries, MRS Energy & Sustainability—A Review Journal 7(1) Aug. 2020, DOI:10.1557/mre.2020.25.

* cited by examiner

RECYCLING ALL SOLID STATE BATTERY TECHNOLOGY

RELATED APPLICATIONS

This application is a 371 national stage filing of International Application No. PCT/US2020/064288, filed Dec. 10, 2020, which claims the benefit of the priority of U.S. Application No. 62/946,343, filed Dec. 10, 2019, each of which is incorporated herein by reference in its entirety.

FIELD OF THE INVENTION

The present invention relates to a process for recycling, including recovery and regeneration, of all materials from spent all solid-state batteries, specifically the solid-electrolyte and high voltage cathode materials used in the solid-state battery.

BACKGROUND

A lithium metal secondary battery includes a positive transition metal oxide-based cathode, a negative metallic lithium anode, and a liquid electrolyte that is lithium ion conductive between the positive and negative electrodes. Because the liquid electrolyte is combustible, it is necessary to design the battery with a device configured to minimize temperature increase within the battery when a short circuit occurs. The risks involved in using liquid electrolyte batteries are increasing with the rapidly growing demand for high capacity and energy dense batteries, particularly to address the widespread goals of transitioning the transportation industry from gasoline to electric powered vehicles.

In an all solid-state battery, a solid electrolyte is used instead of a liquid electrolyte, making the entire battery solidified. This configuration allows electrochemical energy to be stored without additional safety devices as the battery is intrinsically non-flammable and resistant to a wide temperature range. Additionally, such solid-state batteries present much higher energy densities compared to conventional lithium ion batteries that rely on liquid-based electrolytes. For these reasons, all solid-state batteries are garnering increasing interest within many industries.

As battery adoption rapidly increases, the challenge of dealing with spent batteries at their end-of-life is also growing. As batteries cannot be easily discarded in landfills, used lithium-based batteries are often reused in secondary applications, and eventually sent for recycling. Most existing battery recycling methods apply to conventional liquid-based lithium ion batteries, using pyrometallurgical or hydrometallurgical methods to recycle the cathode materials in conventional lithium ion batteries, recovering the precious transition metals such as lithium, cobalt, nickel and other elements.

Despite rapidly increasing interest in solid-state batteries, there are no existing known methods to effectively recycle all solid-state batteries, which poses a potential battery waste problem in the near future. The existing battery recycling art involves traditional methods to recycle conventional liquid-based lithium ion batteries, such as pyrometallurgy or hydrometallurgy. Pyrometallurgical and Hydrometallurgical are most commonly used to break down recovered cathode materials and regenerate them for reuse. The recovered metals in their precursor forms are subsequently used in cathode re-synthesis with co-precipitation, sol-gel or solid-state heat treatment steps to reform the active materials. The other components of the conventional lithium ion battery such as the separator, liquid electrolyte, additives and lithium salts are typically discarded or incinerated in the traditional recycling processes. Such traditional battery recycling methods tend to be energy intensive, costly and uses toxic organic chemicals processing which can be difficult to handle. Additionally, materials recovery efficiency as a fraction of the entire cell still remain low, due to low recycling rates of other components in the cell such as the liquid electrolytes, lithium salts, separator and additives.

BRIEF SUMMARY

The inventive method provides for the recycling, including recovery and regeneration, of materials from spent all solid-state batteries, specifically the solid-electrolyte and high voltage cathode materials used in the solid-state battery. These recycled materials can then used to fabricate new batteries of equivalent electrochemical properties as the original. The inventive method seeks to address the rapidly growing battery waste accumulation problem, and to offer a new recycling technology that is more environmentally friendly, cost effective and with higher recycling efficiencies. This invention is believed to be the first of its kind to address the issues of recycling all solid-state batteries.

The processes described herein provide a solution to the above-described problems. Specifically, a method is provided to recover spent solid electrolytes and cathode electrodes from lithium metal all solid-state batteries, and directly regenerate them for reuse in new batteries. The new batteries, made entirely of recycled materials from the spent batteries, achieves the same performance as the originals.

According to an embodiment of the inventive method for recycling all solid-state batteries, spent battery cells are dissolved in anhydrous ethanol. The resulting solution is separated into solids and supernatants which are separately processed to regenerate the solid electrolyte and the solid electrode materials. The supernatant is subjected to vacuum evaporation to precipitate an electrolyte powder, which is then annealed under vacuum. The solid electrode material is regenerated by washing the solids with water, drying the washed solids, relithiating the washed solids, and annealing the relithiated solids. The resulting materials are suitable for use in fabrication of new all-solid state batteries.

Compared to conventional battery recycling methods, the inventive approach offers:

a) Ease of recycling: Conventional recycling methods often involve many complicated steps that increase both the degree of sophistication and costs of processing spent batteries, making them less economically viable. The invention involves a new recycling strategy for all solid-state batteries can dramatically reduce the number of physical and chemical processing steps required, utilizing the unique intrinsic properties of solid-state chemistries that allow ease of materials separation and recovery without comprising performance factors such as energy and power density of the device.

b) Enable Direct Regeneration: Existing methods to regenerate cathode materials often involve breakdown of spent cathode materials to their precursor forms. In our invention, direct regeneration of both the solid electrolyte and cathode materials allow for energy efficient methods to recycle these materials without breakdown of their core structure. The regenerated materials can be directly used to fabricate new all solid-state batteries without additional treatment steps.

c) Avoid Waste Generation: The solid-state battery recycling strategy proposed has the potential for minimal waste generation from recovery and regeneration of lithium within the electrolyte, as well as the lack of other side components present in conventional li-ion batteries such as liquid electrolytes, lithium salts, separators and additives.

d) Minimize use of extra chemicals: Conventional recycling methods involve the use of toxic processing organic solvents such as N-Methyl-2-pyrrolidone and various carbonates, drying and vapor recovery of such low vapor pressure solvents require energetic processes that lower energy Using prevailing solid-state battery designs comprising a metallic lithium anode, sulfide solid electrolyte and transition metal oxide cathode as the starting point, spent batteries are first cycled in the stack before disassembly. The intrinsic non-flammability of solid-state electrolytes mitigates fire/explosion safety hazards during packaging breakdown commonly seen in conventional recycling methods.

For solid electrolyte regeneration, the entire intact cell is first submerged in a polar alcohol solution to dissolve and separate sulfide-based solid-state electrolytes from the degraded cathodes in spent all solid-state batteries. Through careful selection of polar solvents based on their chemical interactions with sulfide solid electrolytes, we can prevent chemical degradation of the material, and only achieve dissolution and precipitation in its original chemical formula. Next, the dispersed cell is separated via gravity-based methods such as centrifuge to isolate the solids and supernatants. The supernatant is collected for solid electrolyte regeneration while the solutes are collected for cathode regeneration. The solid electrolyte is regenerated via a single step heat treatment process to regain its original ionic conductivity.

For cathode material regeneration, the solutes collected from gravity-based separation are washed to remove decomposed solid electrolyte interfacial products from each particle surface. As the interfacial components readily undergo hydrolysis with water, only water is used to rinse and filter the recovered cathode particles, revealing clean degraded surfaces. The cleaned degraded cathodes are then regenerated using either direct molten salt or hydrothermal relithiation, achieving the target stoichiometric Li ratio of 1 without breakdown of the material into its precursors. Both recovered and regenerated solid electrolyte and cathode materials can then be used to fabricate a new solid-state battery and its performance was found to be identical to the original pristine battery.

In one aspect of the invention, a method for recycling all solid-state batteries having a solid electrolyte and solid electrode, the method includes: dissolving spent battery cells in a solvent to form a solution; separating the solution into solids and supernatants; regenerating the solid electrolyte by exposing the supernatant to a dynamic heat treatment using vacuum evaporation to precipitate an electrolyte powder, and annealing the electrolyte powder under vacuum; regenerating the solid electrode material by washing the solids with water, drying the washed solids, relithiating the washed solids to achieve a target stoichiometric Li ratio of 1, and annealing the relithiated solids; wherein the regenerating steps are performed in any order, and wherein the resulting electrolyte powder and relithiated solids are suitable for fabrication of new all solid state batteries. In some embodiments, the step of relithiating includes suspending the solids in a solution of LiOH, exposing the LiOH solution to hydrothermal processing, and rinsing excess LiOH from the solids. The hydrothermal processing may involve placing the solution within a sealed autoclave flask at an elevated temperature (e.g., between around 150 and 300° C.) for a period of several hours, e.g., somewhere in the range of 1 to 10 hours. The solution of LiOH is within a range of 0.1M to 10M. The step of separating may involve centrifuging the solution. The step of annealing the relithiated solids may include heating to between to 400-800° C. under flowing oxygen for 4-12 hours. The step of dissolving may include submerging the spent battery cells in a container of anhydrous ethanol in an inert gas environment and agitating the solution until the solid electrolyte is fully dissolved. The dynamic heat treatment can involve heating the supernatant to a range of 40 to 100° C. for from around 2 to 10 hours.

In another aspect of the invention, a method for recycling solid electrolyte materials and solid electrode materials within a spent battery includes: dissolving the spent battery in a solvent to form a solution, separating the solution into solids and supernatants, regenerating the solid electrolyte materials by processing the supernatant using vacuum evaporation to precipitate an electrolyte powder, and annealing the electrolyte powder under vacuum, and regenerating the solid electrode materials by washing the solids with water, drying the washed solids, relithiating the washed solids to achieve a target stoichiometric Li ratio of 1, and annealing the relithiated solids, wherein the regenerating steps are performed in any order, and wherein the resulting electrolyte powder and relithiated solids are suitable for fabrication of new all solid state batteries.

In some embodiments, the step of relithiating may include suspending the solids in in a solution of lithium salt or using hydrothermal relithiation to achieve a target stoichiometric Li ratio of 1 a solution of LiOH and rinsing excess LiOH from the solids. The hydrothermal processing may involve heating the solution within a sealed autoclave flask at an elevated temperature, within a range of around 150 to 300° C., for a period of several hours, e.g., somewhere in the range of 1 to 10 hours. The solution of LiOH may within a range of 0.1M to 10M. The step of separating may involve centrifuging the solution. The step of annealing the relithiated solids may include heating to between to 400-800° C. under flowing oxygen for 4-12 hours. The step of dissolving may include submerging the spent battery cells in a container of anhydrous ethanol in an inert gas environment and agitating the solution until the solid electrolyte is fully dissolved. The dynamic heat treatment can involve heating the supernatant to a range of 40 to 100° C. for from 2-10 hours.

BRIEF DESCRIPTION OF THE DRAWINGS

FIG. 3A shows X-ray diffraction patterns; FIG. 3B compares ionic conductivities of various corresponding regeneration conditions; FIG. 3C provides digital images of solid electrolytes and their respective carbon wt % using CHNS analysis; and FIG. 3D compares Raman patterns of heat treated solid electrolyte under various conditions.

FIG. 4B compares x-ray diffraction patterns for pristine and recycled material; FIG. 4C shows Nyquist plots of the solid-state electrolyte at pristine and recycled states; FIG. 4D compares the FTIR spectra for pristine and recycled material.

DETAILED DESCRIPTION OF EMBODIMENTS OF THE INVENTION

Throughout this description, certain acronyms and abbreviations are used, including the following:

ASSBs—All Solid State Batteries

LIBs—Lithium Ion Batteries

SSE—Solid State Electrolyte

The inventive method for recycling and remanufacture of ASSBs applies to a wide variety of solid-state battery chemistries including, but not limited to, those using: $Li_2Sx.P_2S_5y$, $Li_6PS_5X$, $LiM_xP_xS_z$ sulfide based solid electrolytes LCO, NMC, NCA, LFP, LMO-based cathode materials, graphite, silicon, lithium metal based anode materials.

Figure 2:
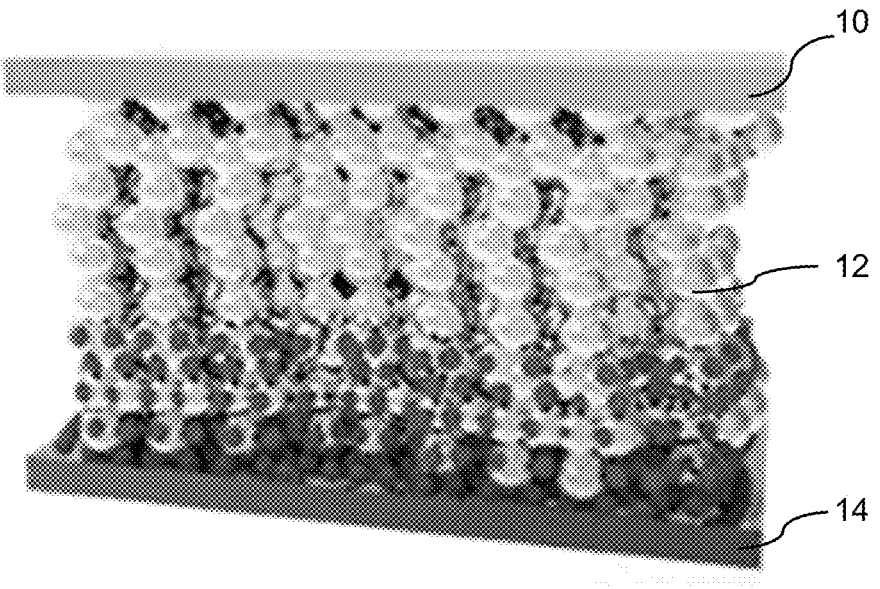
FIG. 2 is a diagrammatic view of the components of an exemplary all solid state battery (ASSB).

Referring briefly to the diagram in FIG. 2, an exemplary ASSB includes a lithium metal anode 10, a sulfide solid-state electrolyte 12, and a transition metal oxide cathode 14. In the non-limiting, illustrative example described herein for evaluation of the effectiveness of the inventive scheme, the ASSB includes a $LiCoO_2$ positive electrode 10, a lithium metal negative electrode 14, and a $Li_6PS_5Cl$ solid state electrolyte 12 interposed between the positive electrode and the negative electrode. The average particle diameter of the solid-state electrolyte is used within a range suitable for all solid-state batteries. For example, the average particle diameter of the $Li_6PS_5Cl$ solid state electrolyte particles may be between 0.1 μm to 50 μm. Ideally, the solid-state electrolyte selected should have an ionic conductivity of $1\times10^{-3}$ S cm$^{-1}$ or greater. The all solid-state battery was fabricated using a dry compression process in which electrode powder and solid electrolyte powder were prepared, introduced into a predetermined mold, and pressed in a composition of (70: 30), with a 70 weight % fraction of cathode electrode and 30 weight % fraction of solid electrolyte. A 100 μm thick lithium metal foil was used as the negative electrode. As will be apparent to those of skill in the art, any other appropriate method for fabrication of ASSBs may be used. In one example, the solid electrolyte may be disposed between the positive electrode and the negative electrode and then the combined layers compressed at 370 MPa to assemble the cell. The assembled cell can then be encapsulated within a case of aluminum or stainless steel, or a prismatic metal container that can be used to retain and protect the cell.

The completed cell was electrochemically cycled through 100-200 cycles to simulate actual application in a device. Once the cycling was completed, the inventive recycling method can be applied to recover and regenerate the embedded solid electrolyte and cathode electrode powders in the cell.

Referring to the lower panel of FIG. 1, to separate the solid electrolyte within the spent ASSB, the entire battery was first submerged in an appropriate solvent. Suitable polar solvents for use in the inventive method include ethanol, methanol, propanol, butanol, acetonitrile, and tetrahydrofuran (THF), with the preferred solvent being anhydrous ethanol. The dissolution step is preferably conducted under an inert gas environment, e.g., argon. The battery was stirred or physically agitated within the ethanol until all of the solid electrolyte was fully dissolved, producing a dark suspension of dissolved solid electrolyte in the supernatant, and black electrode powders in the solute. In the second step, the solution was phase separated using a high rotation centrifuge at about 3500 rpm until the solutes were separated from the solution.

After decanting the supernatant, the dissolved solid electrolyte (SSE) within the supernatant was precipitated using vacuum evaporation by heating to a range of 40 to 100° C. for from 2-10 hours. During the exemplary procedures described herein, the temperature and time were 80° C. and 2 hours. The resulting dry SSE powders exhibited similar structural properties to the pristine material but had ionic conductivities up to 2 orders lower than the pristine SSE material. The powders were next placed in a heated environment between 400-500° C. to thermally anneal them. The heating was done under dynamic vacuum to minimize residual carbon-based organics that might remain from the ethanol dissolution process. The resulting SSE powders exhibited ionic and electronic conductivities that were identical to the pristine material. The powder can then be used to fabricate a new all solid-state battery using the same steps described for the original fabrication.

To treat the recovered cathode electrode materials, the remaining solute from the centrifuge separation process was first washed with water in ambient environments. Washing with water removes all surface oxidized interfacial products formed on the cathode particles during battery cycling. As the interfacial components readily undergo hydrolysis with water, only water is required to rinse and filter the recovered cathode particles, revealing clean degraded surfaces. After washing, the cathode particles were dried by heating to a range of 40 to 100° C. under vacuum. In the exemplary procedures described herein, the temperature was 80° C. The cathode particles were then regenerated using hydrothermal relithiation. For relithiation, the cathode particles were first suspended in a 0.1M to 10M LiOH solution. In the exemplary procedure described herein, a solution of 4M was used. The solution was placed in a hydrothermal autoclave flask and sealed. The flask was then subjected to elevated temperatures between around 150 and 300° C. for a period of from 1 to 10 hours to induce relithiation of the lithium depleted cathode material. For the exemplary procedure, the temperature used was 220° C. and the time 4 hours. After relithiation, the excess LiOH solution was rinsed away, and the cathode particles were annealed by heating between 400-800° C. under flowing oxygen for 4-12 hours. The resulting cathode powders were evaluated and found to exhibit identical voltage profiles and capacities to the pristine material. The final obtained powder can then be used to refabricate a new all solid-state battery using the same steps described in the original battery fabrication.

Figures 1A, 1B:
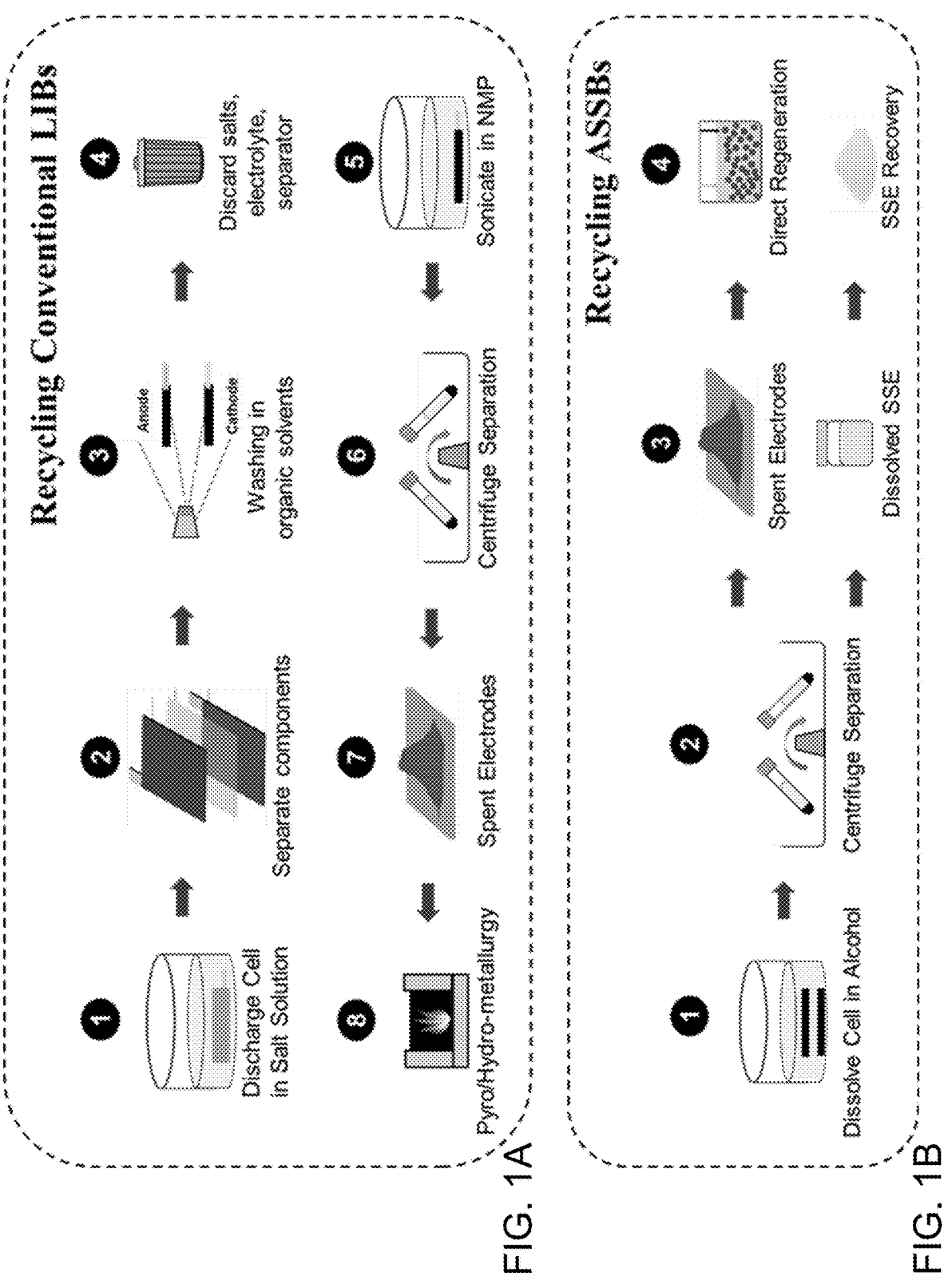
FIGS. 1A and 1B diagrammatically contrast the differences between conventional lithium ion battery recycling (FIG. 1A) and the inventive method (FIB. 1B), including reduced processing steps, improved dismantling safety, and avoidance of toxic solvents.

A comparison of FIGS. 1A and 1B illustrates the differences between conventional lithium ion battery recycling (FIG. 1A) and the inventive method (FIG. 1B). Briefly, the using conventional recycling techniques, the spent ASSB is placed in a salt solution, separated into components, then washed in organic solvents. The resulting materials are separated, and the salts discarded. The materials are sonicated in NMP (N-methyl-2-pyrrolidone), subjected to centrifuge separation then dried to provide the electrode powders. These powders are then processed using pyro- or hydrometallurgical techniques to recover raw materials that can be used in the manufacture of new batteries. The multiple advantages of the inventive approach described herein, represented in the lower panel of FIG. 1, include: reduced processing steps, improved dismantling safety, avoidance of toxic solvents, reduced energy costs/carbon footprint, avoidance of waste generation, recovery of all components of spent batteries, direct regeneration avoids breakdown of material to raw, and lowering of overall recycling costs.

Figure 3A:
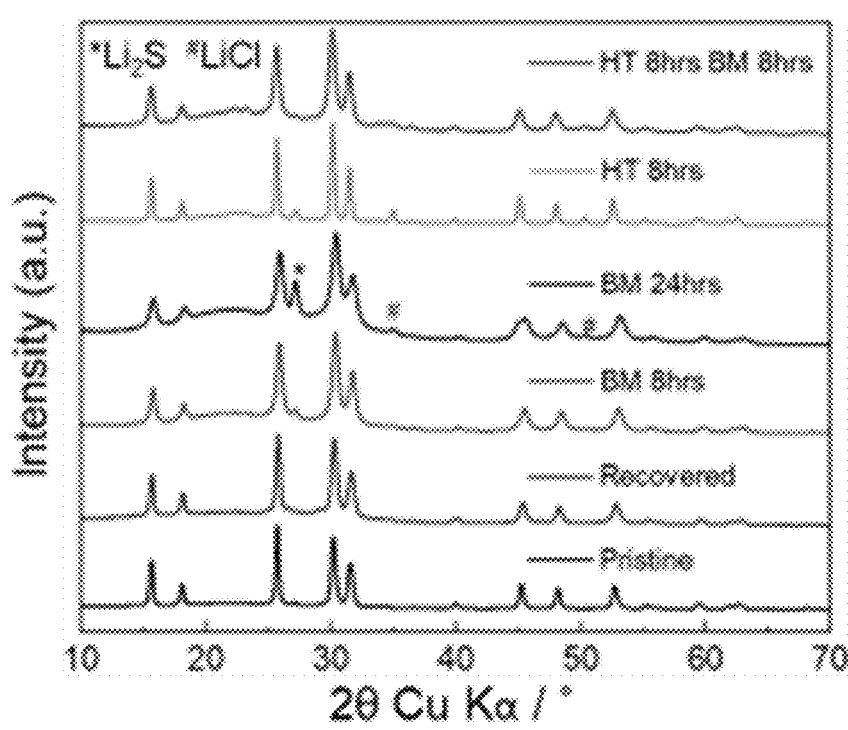
FIGS. 3A-3D illustrate test results for $Li_6PS_5Cl$ solid electrolyte recovery and regeneration with ethanol, where
Figure 3B:
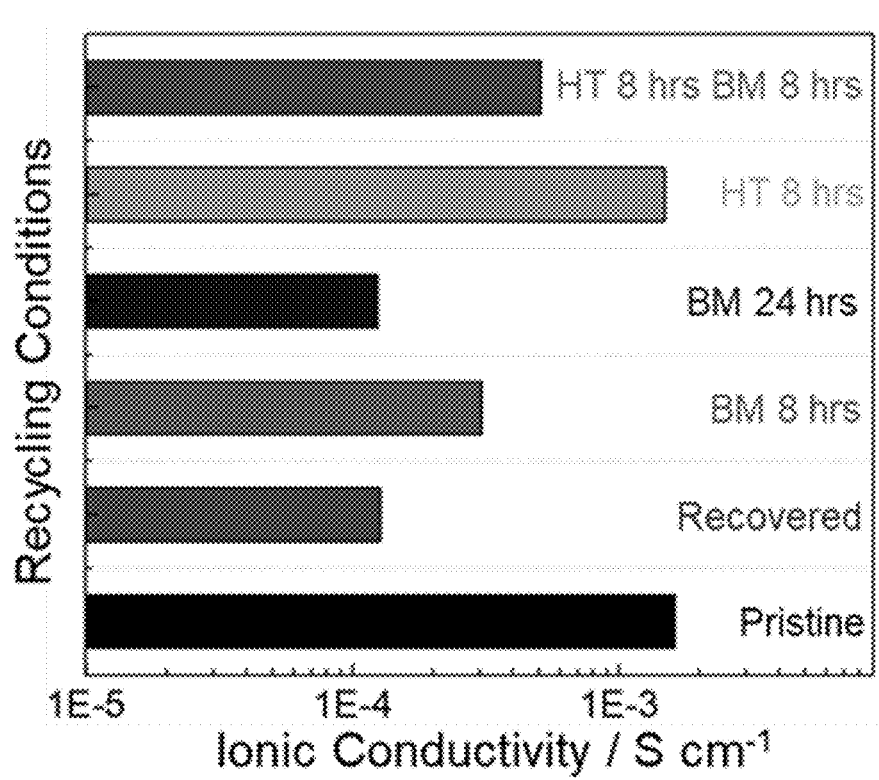
Figure 3C:
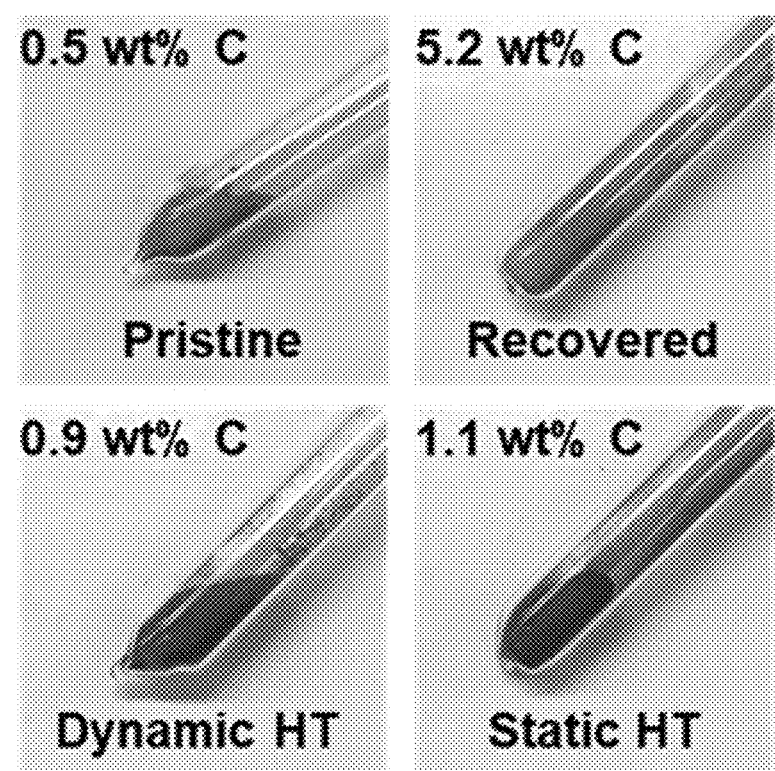

The effectiveness of the inventive recycling technique was evaluated using the ASSBs generated as described above. FIGS. 3A-3D illustrate various results obtained following Li₆PS₅Cl solid electrolyte recovery and regeneration with ethanol. FIG. 3A compares X-ray diffraction patterns from ball milling and heat treatment. Both ball milling and heat treatment are studied to compare different effects of regeneration techniques on the solid electrolyte material. It is seen that a single step heat treatment process is able to regain both the crystallinity and target phase of the Li₆PS₅Cl solid electrolyte material after the ethanol solution recovery process, when compared with the pristine material. In FIG. 3B, ionic conductivities of various corresponding regeneration conditions are compared. It is seen that a single step heat treatment process is able to regain the ionic conductivity of the Li₆PS₅Cl solid electrolyte material after the ethanol solution recovery process, when compared with the pristine material. FIG. 3C provides photographic images of glass tubes containing the solid electrolytes and their respective carbon wt % according to CHNS analysis. To avoid carbon deposition from the organic impurities, dynamic heat treatment (heating under vacuum) is used, the values indicates in the images compare the amounts of carbon remaining after each treatment condition along with the color of the regenerated solid electrolyte. Specifically, the pristine electrolyte was measured at 0.5 wt % C (upper left), recovered electrolyte had 5.2 wt % C (upper right), electrolyte subjected to dynamic heat treatment had 0.9 wt % C, and electrolyte treated under status heat treatment measured 1.1 wt % C.

Figure 3D:
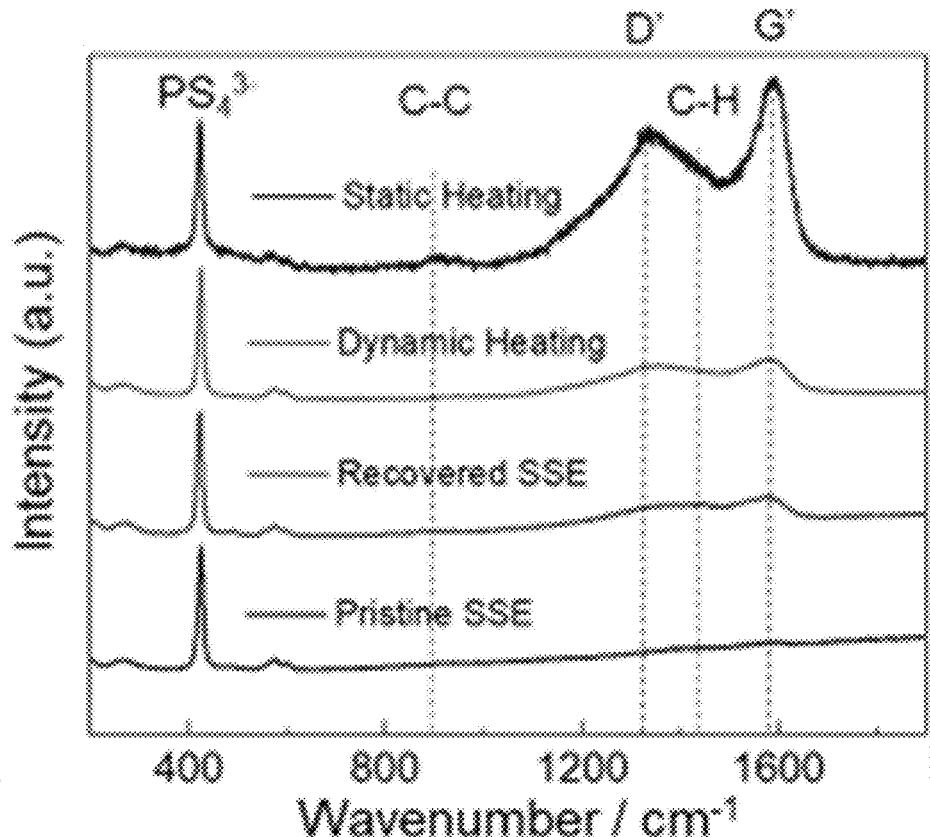

FIG. 3D compares Raman patterns of heat-treated solid electrolyte the conditions used on the materials shown in FIG. 3C, i.e., top to bottom, static heat treatment, dynamic heat treatment, recovered spent solid state electrolyte (SSE), and pristine SSE. The Raman spectra allows assessment of the quantity of elemental carbon that remain within the solid electrolyte material after each regeneration condition. As can be seen from FIG. 3D, the material subjected to dynamic heat treatment approaches the values for pristine material and exhibits much reduced elemental carbon compared to static heating.

Figure 4A:
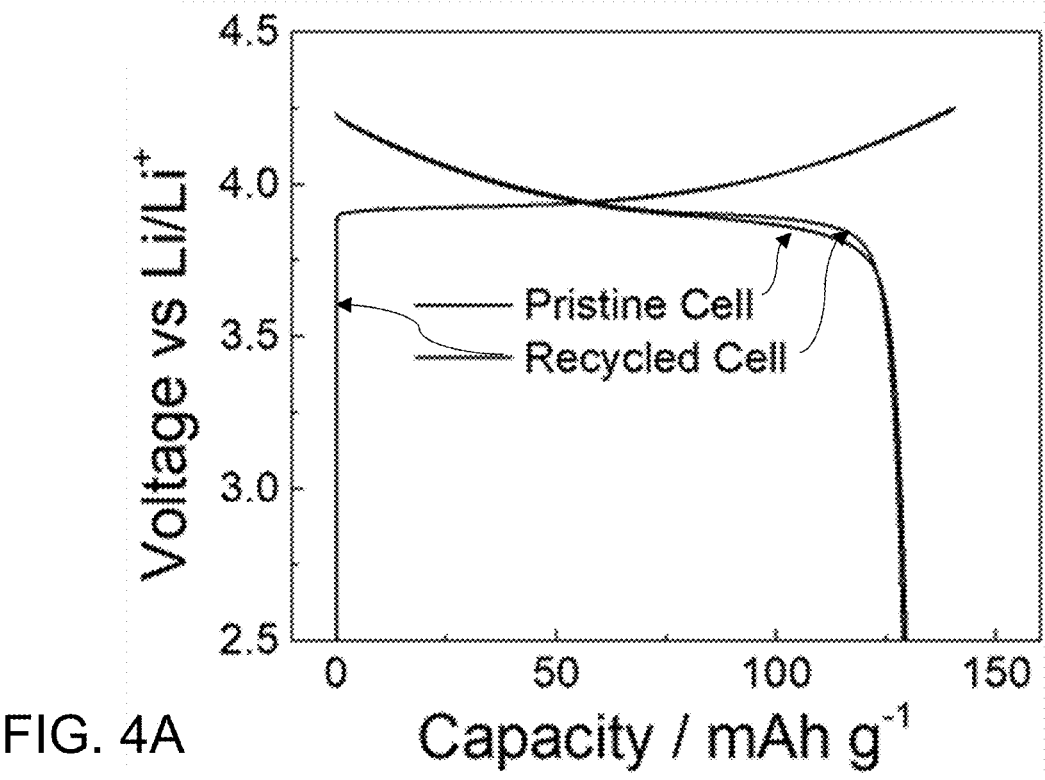
FIGS. 4A-4D provide electrochemical measurements of recycled solid state electrolyte, where FIG. 4A compares an exemplary 1st cycle voltage profile of all solid-state batteries using pristine vs recycled material.
Figure 4B:
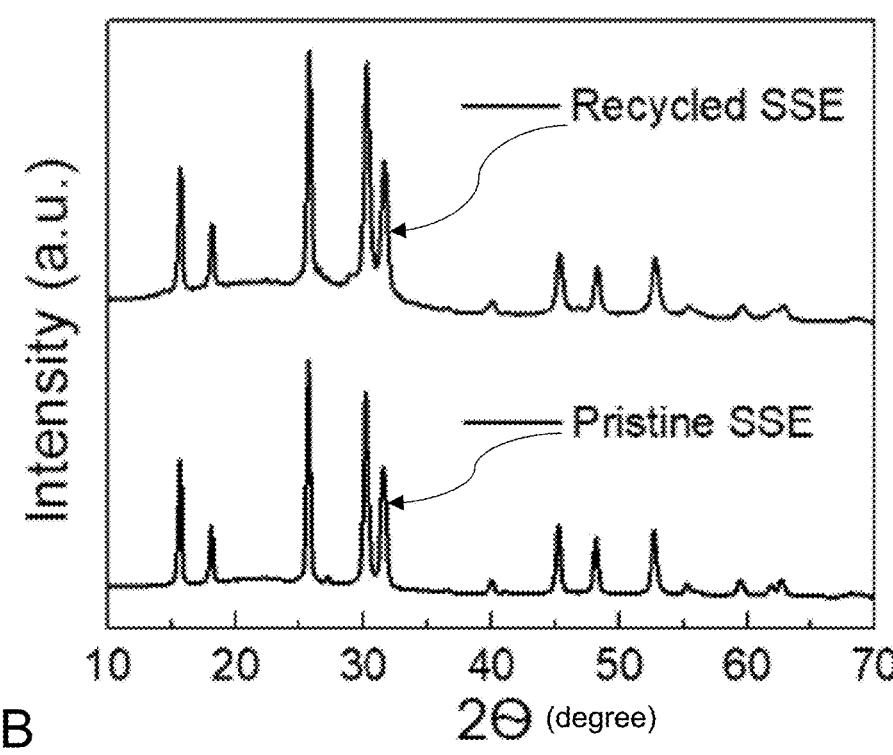
Figure 4C:
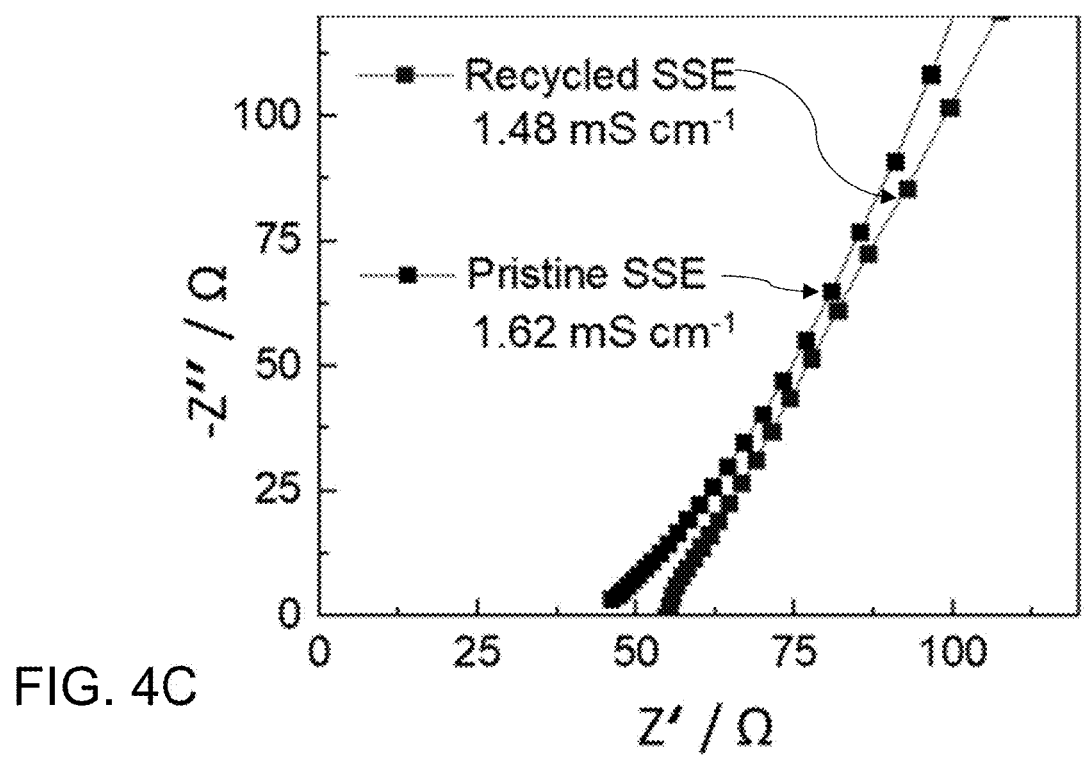
Figure 4D:
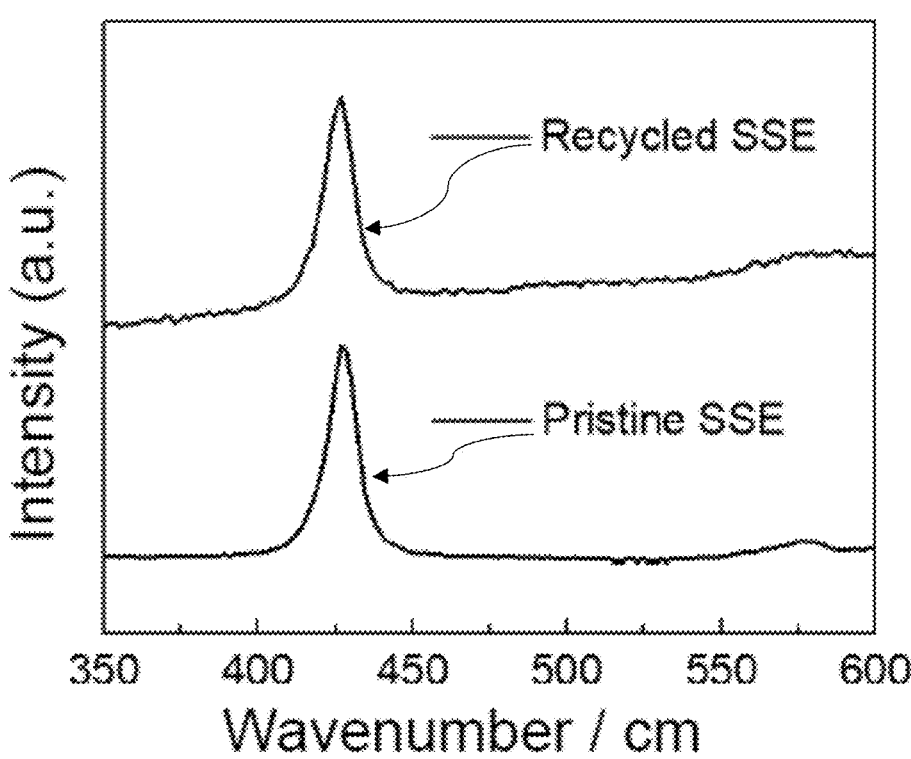

FIG. 4A shows the 1st cycle voltage profile of all solid-state batteries using pristine versus recycled material. It can be seen that the thermodynamic voltage curves are so similar they are nearly overlapping, indicating effective recovery and regeneration of the solid-state electrolyte. The all solid-state batteries are cycled between 2.50-4.25 V at a 0.1 C rate under room temperature, with a typical cathode active loading of 13 mg/cm². FIG. 4B is a comparison of XRD analysis of the recycled and pristine SSE materials. FIG. 4C compares Nyquist plots of the solid-state electrolyte at pristine and recycled states, and FIG. 4D provides the FTIR spectra for pristine and recycled material. Each evaluation demonstrated the near perfect recovery of electrochemical properties using the inventive approach.

It can be seen that the ionic conductivities derived from the electrochemical impedance plots are similar. To measure this, an alternating current voltage was applied through the electrodes on the opposite surfaces of the electrolyte. The amplitude of the voltage was set to 30 mV, which was the amplitude used to measure the impedance of a secondary battery using a general liquid electrolyte, and the measurement frequency range was set to a range of 0.1 Hz to 1 MHz. The resistance of the electrolyte was calculated from an intersection point of the actual axis, and the ion conductivity of the electrolyte was calculated from the cross section area A and the thickness 1 of the sample and expressed by the following equation.

$$\sigma(\Omega \cdot cm)^{-1} = \frac{1}{R_b} \frac{l}{A}$$

Figure 5A:
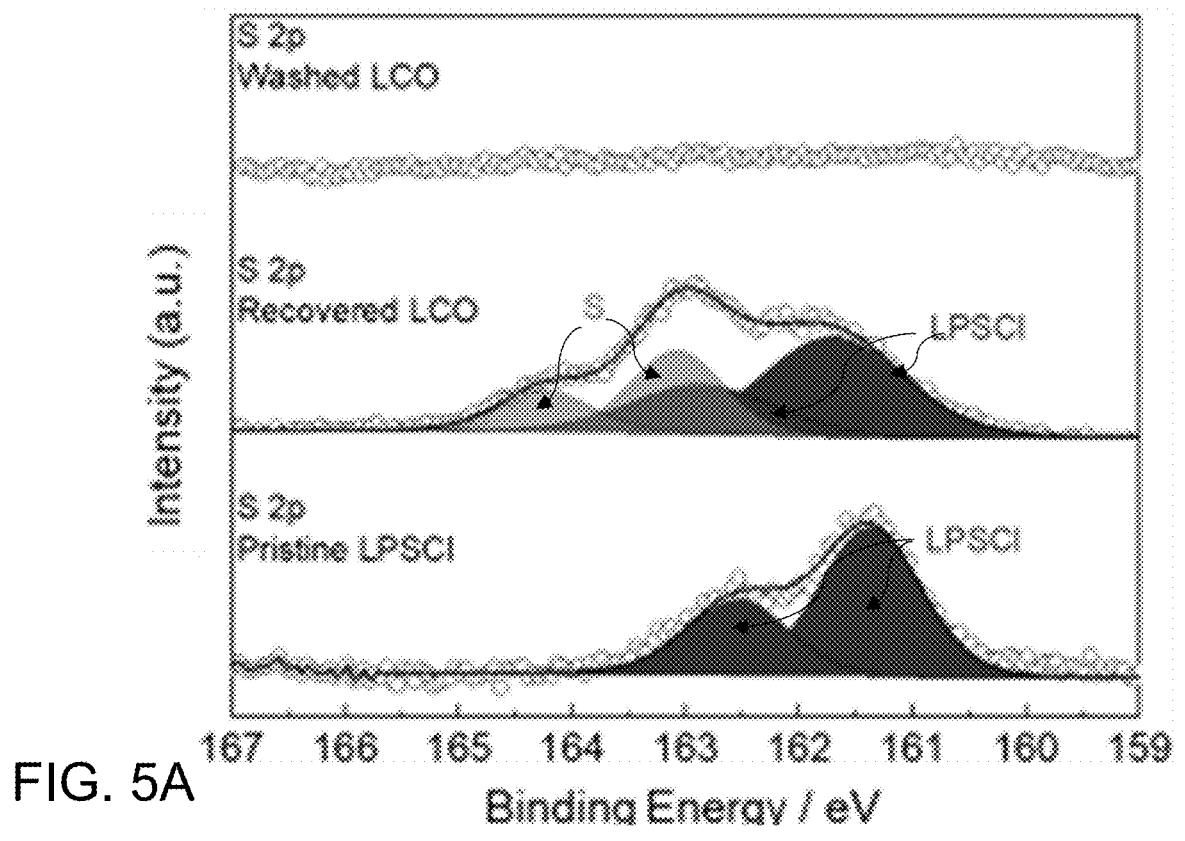
FIGS. 5A-5D are plots of binding energies for pristine electrolyte, recovered $LiCoO_2$ and washed $LiCoO_2$ at the Sulfur 2p region (FIG. 5A), Phosphorus 2p region (FIG. 5B), Recovered $LiCoO_2$ (FIG. 5C); and Washed LCO (FIG. 5D).
Figure 5B:
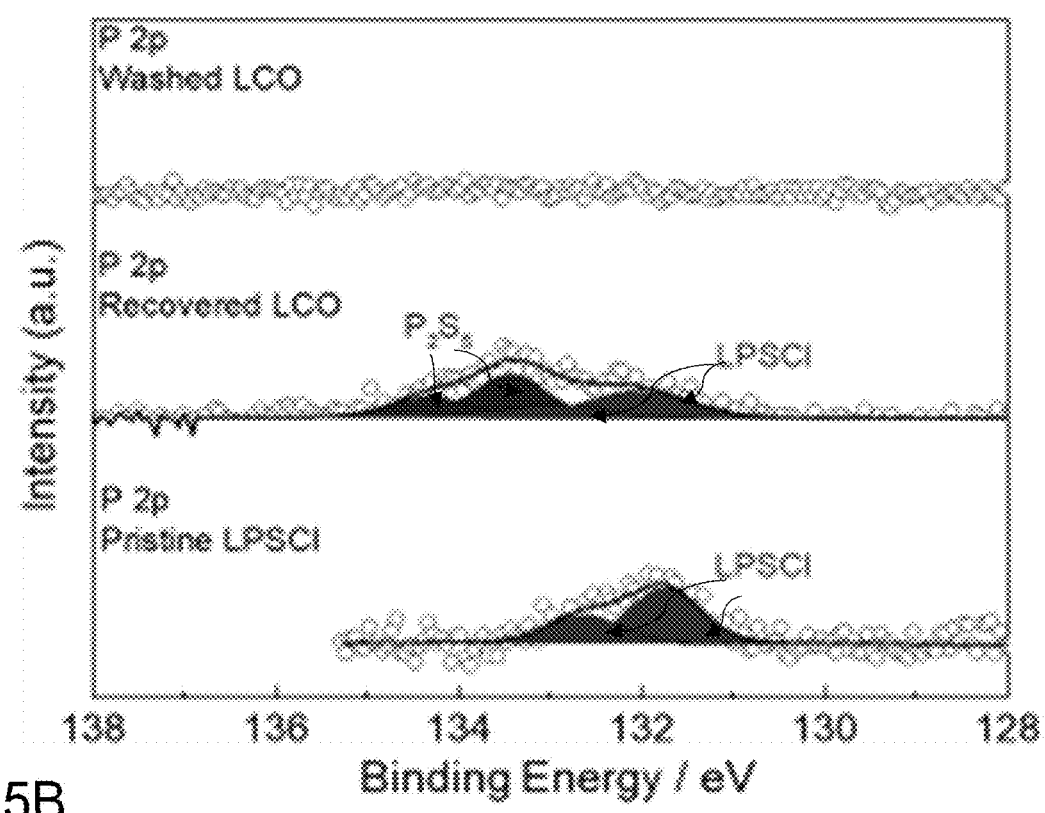
Figure 5C:
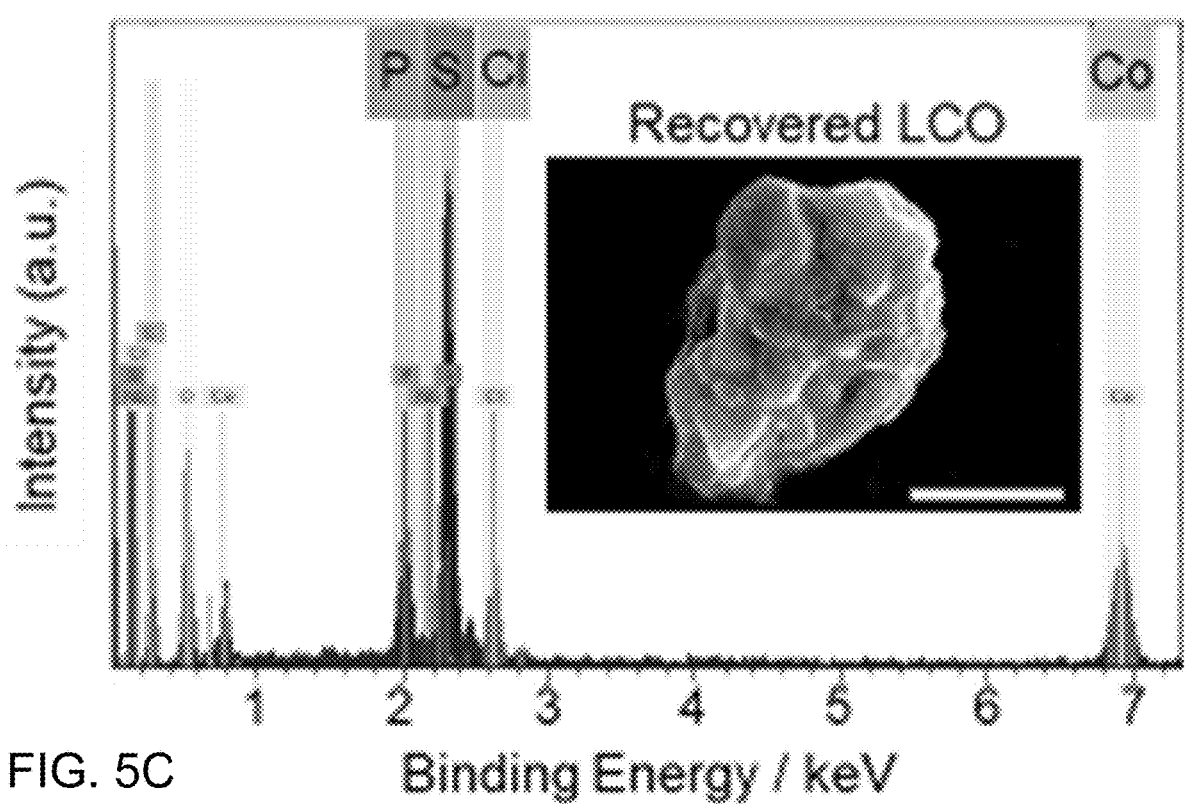
Figure 5D:
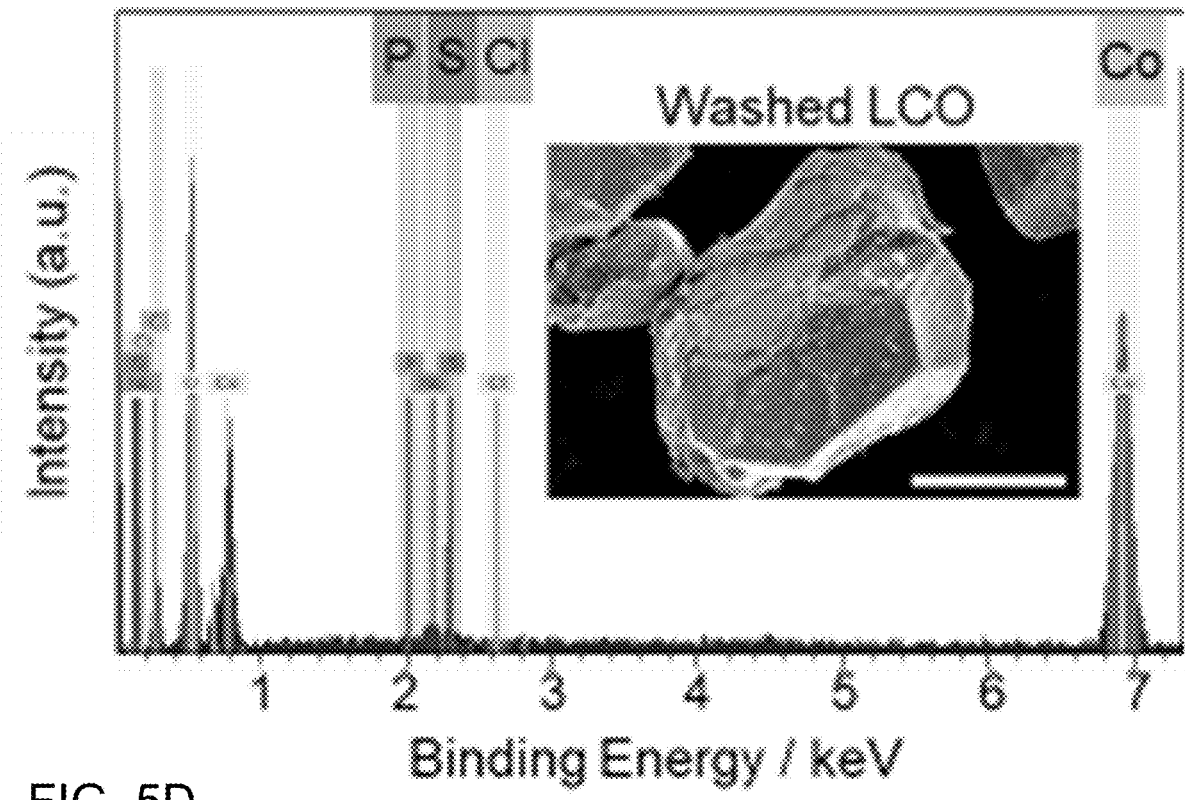

Before regeneration of the spend cathode electrodes, the freshly separated cathode particles must first be treated with water wash to remove surface impurities from the interfacial oxidized products. FIG. 5A provides X-ray photo electron spectroscopy spectra showing the binding energies for pristine electrolyte (lower), recovered LiCoO₂ (middle) and washed LiCoO₂ (upper) at Sulfur 2p region (FIG. 5A). As shown, the washed sample shows no signals remaining from the original solid electrolyte or the interfacial products of elemental Sulfur. FIG. 5B provides the same results for Phosphorus 2p region. Here, the washed sample shows no signals remaining from the original solid electrolyte or the interfacial products of phosphorus pentasulfide. FIGS. 5C and 5D compare energy-dispersive X-ray mapping showing the relative intensities of P, S and Cl containing interfacial components. FIG. 5C shows recovered LiCoO₂, where the recovered particle shows strong signals from P, S and Cl interfacial components along with Co signals from the LiCoO₂ material itself. FIG. 5D provides the results for washed LCO, where the washed particle shows no signals from P, S and Cl interfacial components along with Co signals from the LiCoO₂ material itself. The insets in FIGS. 5C and 5D provide an SEM image of the respective particles. The inventive method provides complete recycling capability including recovery and regeneration of all materials from end-of-life all solid state batteries (ASSBs) without requiring the materials to be completely reduced to raw materials. The resulting recycled materials can then be used to fabricate new batteries having equivalent electrochemical properties and performance compared to the original. The inventive approach provides an achievable solution to battery waste accumulation arising from the growing demand for electric vehicles and overall renewable energy storage, offering a new recycling technology that is more environmentally friendly, cost effective and has higher recycling efficiencies.

REFERENCES

Yun, L. et al. Metallurgical and mechanical methods for recycling of lithium-ion battery pack for electric vehicles. *Resources, Conservation and Recycling* 136, 198-208, doi:10.1016/j.resconrec.2018.04.025 (2018).

Zhang, X. et al. Toward sustainable and systematic recycling of spent rechargeable batteries. *Chem. Soc. Rev.* 47, 7239-7302, doi:10.1039/c8cs00297e (2018).

Li, L. et al. The Recycling of Spent Lithium-Ion Batteries: a Review of Current Processes and Technologies. *Electrochemical Energy Reviews* 1, 461-482, doi:10.1007/s41918-018-0012-1 (2018).

Lv, W. et al. A Critical Review and Analysis on the Recycling of Spent Lithium-Ion Batteries. *ACS Sustainable Chemistry & Engineering* 6, 1504-1521, doi:10.1021/acssuschemeng.7b03811 (2018).

The invention claimed is:

1. A method for recycling a spent all-solid-state battery comprising a solid electrolyte and solid electrode, the method comprising:

dissolving intact spent battery cells in a solvent to form a solution;

separating the solution into solids and supernatants;

regenerating the solid electrolyte by:

exposing the supernatant to a dynamic heat treatment using vacuum evaporation to precipitate an electrolyte powder; and annealing the electrolyte powder under vacuum;

regenerating the solid electrode material by:

washing the solids with water;

drying the washed solids;

relithiating the washed solids to achieve a target stoichiometric Li ratio of 1; and annealing the relithiated solids;

wherein the regenerating steps are performed in any order, and wherein the resulting electrolyte powder and relithiated solids are suitable for fabrication of new all-solid-state batteries.

2. The method of claim 1, wherein the step of relithiating comprises:

suspending the solids in a solution of LiOH;

exposing the LiOH solution to hydrothermal processing; and rinsing excess LiOH from the solids.

3. The method of claim 2, wherein hydrothermal processing comprises placing the solution of LiOH within a sealed autoclave flask at an elevated temperature at around 150° C. to 300° C. for from 1 to 10 hours.

4. The method of claim 2, wherein the solution of LiOH is within a range of 0.1M to 10M.

5. The method of claim 1, wherein the step of separating comprises centrifuging the solution.

6. The method of claim 1, wherein the step of annealing the relithiated solids comprises heating to between to 400° C. to 800° C. under flowing oxygen for 4-12 hours.

7. The method of claim 1, wherein the step of dissolving comprises submerging the spent battery cells in a container of the solvent in an inert gas environment and agitating the solution until the solid electrolyte is fully dissolved.

8. The method of claim 7, wherein the solvent is a polar solvent selected from the group consisting of ethanol, methanol, propanol, butanol, acetonitrile, and tetrahydrofuran.

9. The method of claim 7, wherein the solvent is anhydrous ethanol.

10. The method of claim 1, wherein the dynamic heat treatment comprises heating the supernatant to within a range of 25° C. to 150° C. for from 1 to 10 hours.

11. A method for recycling solid electrolyte materials and solid electrode materials within a spent all-solid-state battery, the method comprising:

dissolving the intact spent all-solid-state battery in a solvent to form a solution;

separating the solution into solids and supernatants;

regenerating the solid electrolyte materials by:

processing the supernatant using vacuum evaporation to precipitate an electrolyte powder; and annealing the electrolyte powder under vacuum;

regenerating the solid electrode materials by:

washing the solids with water;

drying the washed solids;

relithiating the washed solids to achieve a target stoichiometric Li ratio of 1; and annealing the relithiated solids;

wherein the regenerating steps are performed in any order, and wherein the resulting electrolyte powder and relithiated solids are suitable for fabrication of new all solid-state batteries.

12. The method of claim 11, wherein the step of relithiating comprises placing the washed solids in a solution of lithium salt or using hydrothermal relithiation to achieve a target stoichiometric Li ratio of 1.

13. The method of claim 12, wherein hydrothermal relithiation comprises:

suspending the solids in a solution of LiOH;

heating the LiOH solution in a sealed autoclave flask; and rinsing excess LiOH from the solids.

14. The method of claim 13, wherein the sealed autoclave flask is heated to around 150° C. to 300° C. for from 1 to 10 hours.

15. The method of claim 13, wherein the solution of LiOH is within a range of 0.1M to 10M.

16. The method of claim 11, wherein the step of annealing the relithiated solids comprises heating to between 400° C. to 800° C. under flowing oxygen for 4-12 hours.

17. The method of claim 11, wherein the step of dissolving comprises submerging the spent battery cells in a container of the solvent in an inert gas environment and agitating the solution until the solid electrolyte is fully dissolved.

18. The method of claim 17, wherein the solvent is a polar solvent selected from the group consisting of ethanol, methanol, propanol, butanol, acetonitrile, and tetrahydrofuran.

19. The method of claim 17, wherein the solvent is anhydrous ethanol.

20. The method of claim 11, wherein the vacuum evaporation comprises heating the supernatant to within a range of 25° C. to 150° C. for from 1 to 10 hours.

* * * * *